(12) United States Patent
O'Brien et al.

(10) Patent No.: US 9,904,954 B2
(45) Date of Patent: Feb. 27, 2018

(54) FLEXIBLE COMMERCIAL LOAN POOL

(71) Applicant: Ten-X, LLC, Irvine, CA (US)

(72) Inventors: Elizabeth O'Brien, Irvine, CA (US); Samuel Harrity, Irvine, CA (US)

(73) Assignee: TEN-X, LLC, Irvine, CA (US)

(*) Notice: Subject to any disclaimer, the term of this patent is extended or adjusted under 35 U.S.C. 154(b) by 575 days.

(21) Appl. No.: 14/214,458

(22) Filed: Mar. 14, 2014

(65) Prior Publication Data

US 2014/0297447 A1 Oct. 2, 2014

Related U.S. Application Data

(60) Provisional application No. 61/802,319, filed on Mar. 15, 2013.

(51) Int. Cl.
| | | |
|---|---|---|
| *G06Q 30/00* | (2012.01) | |
| *G06Q 30/08* | (2012.01) | |
| *G06Q 40/00* | (2012.01) | |
| *G06Q 40/04* | (2012.01) | |

(52) U.S. Cl.
CPC ............ *G06Q 30/08* (2013.01); *G06Q 40/04* (2013.01)

(58) Field of Classification Search
CPC ......... G06Q 30/08; G06Q 30/00; G06Q 40/00
USPC ................... 705/26.3, 35, 36 R, 37
See application file for complete search history.

(56) References Cited

U.S. PATENT DOCUMENTS

| | | | | |
|---|---|---|---|---|
| 6,947,906 | B1 * | 9/2005 | Underwood | G06Q 20/10 705/26.3 |
| 7,136,833 | B1 * | 11/2006 | Podsiadlo | G06Q 30/08 705/37 |
| 7,225,151 | B1 | 5/2007 | Konia | |
| 7,672,894 | B2 | 3/2010 | Rebane et al. | |
| 7,860,749 | B2 * | 12/2010 | Subramanian | G06Q 30/0633 705/26.3 |
| 7,991,681 | B2 * | 8/2011 | Dort | G06Q 40/00 705/37 |
| 8,204,809 | B1 * | 6/2012 | Wise | G06Q 40/00 705/35 |
| 8,818,891 | B1 * | 8/2014 | DiCarlo | G06Q 40/04 705/37 |
| 2002/0032626 | A1 * | 3/2002 | DeWolf | G06Q 10/06 705/35 |
| 2002/0082977 | A1 | 6/2002 | Hammond | |
| 2002/0169705 | A1 | 11/2002 | Gutierrez et al. | |
| 2003/0018563 | A1 * | 1/2003 | Kilgour | G06Q 40/02 705/37 |
| 2003/0023537 | A1 | 1/2003 | Joshi et al. | |
| 2003/0204408 | A1 | 10/2003 | Guler et al. | |

(Continued)

OTHER PUBLICATIONS

Non-Final Office Action dated Aug. 28, 2014 for U.S. Appl. No. 14/214,643, 26 pages.

(Continued)

*Primary Examiner* — Oluseye Iwarere
(74) *Attorney, Agent, or Firm* — Mahamedi IP Law LLP

(57) ABSTRACT

Bidding activity is analyzed over a duration in which multiple bids are received in the auction. A bid increment is dynamically determined for the auction in response to auction activity. An online auction system can utilize the bid increment to determine or suggest the next bid that can be received in the auction for purpose of supplanting the current bid.

16 Claims, 6 Drawing Sheets

(56) References Cited

U.S. PATENT DOCUMENTS

| | | | |
|---|---|---|---|
| 2004/0243504 A1* | 12/2004 | Asher | G06Q 20/1085 |
| | | | 705/37 |
| 2005/0119966 A1 | 6/2005 | Sandholm | |
| 2005/0187859 A1 | 8/2005 | Growney | |
| 2005/0222914 A1 | 10/2005 | Asher | |
| 2006/0030402 A1 | 2/2006 | Chandrakumar et al. | |
| 2006/0074793 A1* | 4/2006 | Hibbert | G06Q 40/00 |
| | | | 705/38 |
| 2006/0089895 A1* | 4/2006 | Joye | G06Q 40/00 |
| | | | 705/35 |
| 2006/0184443 A1* | 8/2006 | Erez | G06Q 30/08 |
| | | | 705/37 |
| 2007/0011080 A1 | 1/2007 | Jain et al. | |
| 2007/0106596 A1 | 5/2007 | Bayyapu | |
| 2007/0203823 A1 | 8/2007 | Whelchel et al. | |
| 2007/0208708 A1* | 9/2007 | Altounian | G06Q 30/06 |
| 2007/0276745 A1 | 11/2007 | Harinarayan et al. | |
| 2008/0010184 A1* | 1/2008 | Abramson | G06Q 10/087 |
| | | | 705/37 |
| 2008/0046329 A1 | 2/2008 | Logan | |
| 2008/0208717 A1 | 8/2008 | Suleymanov | |
| 2008/0262943 A1 | 10/2008 | Mullendore | |
| 2008/0313089 A1 | 12/2008 | Du Perez | |
| 2009/0177555 A1 | 7/2009 | Milgrom | |
| 2009/0281952 A1* | 11/2009 | Toffey | G06Q 40/00 |
| | | | 705/80 |
| 2010/0088250 A1* | 4/2010 | Magnolia | G06Q 30/08 |
| | | | 705/36 R |
| 2010/0198720 A1* | 8/2010 | Mendizabal | G06Q 40/04 |
| | | | 705/37 |
| 2010/0325017 A1 | 12/2010 | Mirzakhanyan | |
| 2011/0173086 A1 | 7/2011 | Berkowitz | |
| 2011/0178906 A1* | 7/2011 | Joye | G06Q 40/00 |
| | | | 705/35 |
| 2011/0258101 A1* | 10/2011 | Albertelli | G06Q 30/08 |
| | | | 705/37 |
| 2012/0116944 A1* | 5/2012 | DiCarlo | G06Q 40/04 |
| | | | 705/37 |
| 2013/0103532 A1 | 4/2013 | Emura | |
| 2013/0204733 A1* | 8/2013 | Bhogal | G06Q 30/08 |
| | | | 705/26.3 |
| 2013/0311316 A1 | 11/2013 | Yap | |
| 2013/0332331 A1* | 12/2013 | Toffey | G06Q 40/00 |
| | | | 705/37 |
| 2014/0089126 A1* | 3/2014 | Friedman | G06Q 30/08 |
| | | | 705/26.3 |
| 2014/0089139 A1* | 3/2014 | Shotwell | G06Q 30/08 |
| | | | 705/26.35 |
| 2014/0172614 A1* | 6/2014 | Friedman | G06Q 30/08 |
| | | | 705/26.3 |
| 2014/0279160 A1* | 9/2014 | Kinder | G06Q 30/08 |
| | | | 705/26.3 |
| 2015/0066740 A1* | 3/2015 | DiCarlo | G06Q 40/04 |
| | | | 705/38 |
| 2015/0081589 A1* | 3/2015 | RovelleQuartz | G06Q 40/04 |
| | | | 705/36 R |
| 2015/0287132 A1* | 10/2015 | Hudson | G06Q 30/08 |
| | | | 705/26.3 |
| 2016/0371788 A1* | 12/2016 | Rackley, III | G06Q 30/0645 |

OTHER PUBLICATIONS

Final Office Action dated Mar. 10, 2015 for U.S. Appl. No. 14/214,643, 31 pages.

International Search Report and Written Opinion dated Sep. 2, 2015, Application No. PCT/US2014/028753, 7 Pages.

Supplementary European Search Report dated Aug. 10, 2016, EP Application No. 147657001.1, 7 pages.

Communication pursuant to Article 94(3) EPC European Office Action dated Apr. 11, 2017, EP Application No. 14765700.1, 6 pages.

* cited by examiner

FLEXIBLE COMMERCIAL LOAN POOL

RELATED APPLICATIONS

This application claims benefit of priority to Provisional U.S. Patent Application No. 61/802,319, filed Mar. 15, 2013; the aforementioned priority application being hereby incorporated by reference in its entirety for all purposes.

TECHNICAL FIELD

Examples described herein relate to online auctions, and more specifically, to a flexible asset pool for online auctions.

BACKGROUND

Numerous online auction forums exist that enable consumers and sellers to transact for various kinds of items, such as collectibles, electronics and other goods or services.

DETAILED DESCRIPTION

Figure 1:
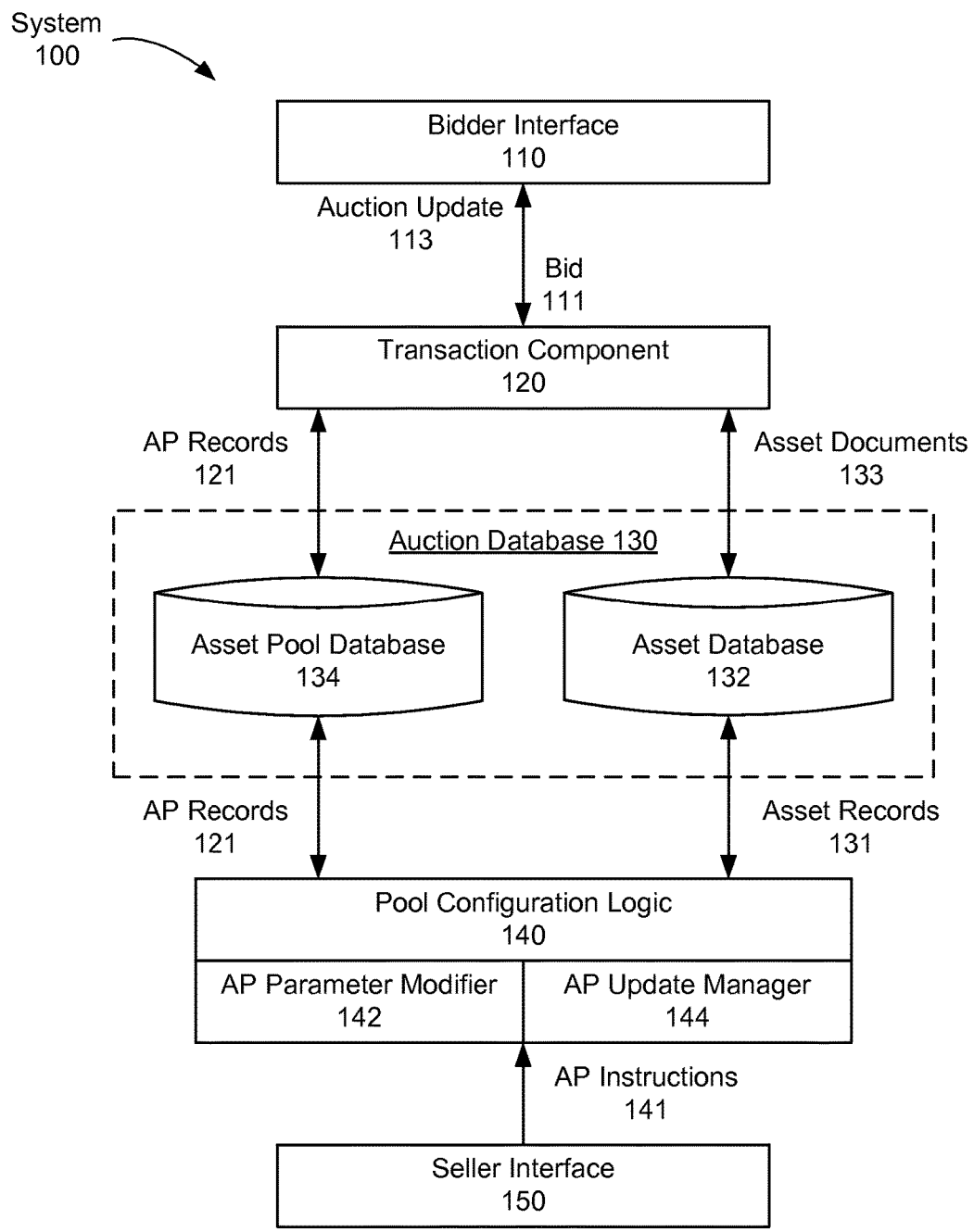
FIG. 1 illustrates an exemplary system for implementing flexible asset pools in an online auction.

Examples described herein provide for online auction forums that utilize flexible asset pools for purposes of dynamically adding and/or removing assets associated with an asset pool. By defining an asset pool as a "flexible" (e.g., dynamically-modifiable) object, asset pools can be updated and/or modified in real-time. Furthermore, bidders may be able to view documents that are associated with new assets as soon as they are added to the asset pool. The use of flexible asset pools can enable asset pool auctions to be carried through to completion even if one or more assets in an asset pool becomes unavailable before the auction is completed.

According to some embodiments, a system and method is provided for generating flexible asset pools in an online auction environment. In some examples, an asset pool is generated based on a set of instructions from the seller. The asset pool is associated with a set of items to be sold in the auction. In examples described herein, the auction system may detect a change in status for the set of items associated with the asset pool (e.g., items being added to and/or removed from the item set). In response thereto, the auction system may dynamically update the asset pool (e.g., to reflect the changes to the set of items) based, at least in part, on the detected changes.

Among other benefits, examples described herein recognize that the status of items associated with an asset pool are susceptible to change. For example, a particular item may become unavailable (e.g., lost, stolen, or destroyed), or the seller may change its mind about selling the item, before the auction period expires. Under conventional implementations, the current asset pool is removed from the auction, and a new one may be created (e.g., manually by the seller) to take its place. Creating a new asset pool typically entails creating a new auction altogether. Accordingly, a clock or timer (e.g., for a "due diligence period") associated with the auction is often reset when the new asset pool is created (e.g., to provide bidders with adequate time to review any documentation associated with the items in the new asset pool).

In contrast, examples described herein recognize that, when a new asset pool is created, typically only a small number of items are new (i.e., the majority of items in the new asset pool are carried over from the old asset pool). It may thus be undesirable to restart the due diligence period, since only a limited number of new documents are likely to be associated with the new items. Therefore, examples described herein provide a mechanism for dynamically updating an asset pool without restarting the due diligence period for the auction.

By way of example, a loan is termed "non-performing" if the borrower fails to perform the terms of the loan agreement (e.g., the owner of real estate is unable to pay the mortgage). Such a loan is called a non-performing loan (NPL). NPLs are typically pooled together and auctioned off as a group to offset the risks associated with individual loans in the loan pool. However, if a homeowner suddenly pays off his or her mortgage, that homeowner's loan may fall out of the loan pool (thus becoming unavailable). Examples described herein enable a seller of the loan pool to dynamically add a new NPL to the pool to replace the loan that fell through.

For some embodiments, one or more asset pool parameters may be updated after modifying (e.g., adding to or removing from) the set of items associated with a particular asset pool. For example, the asset pool parameters may indicate the number of items in the pool, the type(s) of items in the pool, the total value of the asset pool, the value of individual items in the pool, and/or the (geographical) locations of items in the asset pool.

In other embodiments, one or more items may be programmatically added to an asset pool (e.g., to replace items that fell out of the pool) in accordance with a set of predefined asset pool parameters. For example, the seller may configure the asset pool to have one or more "fixed" parameters. Thereafter, if an item associated with an asset pool becomes unavailable, the auction system may add one or more new items (e.g., from a database of items) to the asset pool without the need for seller input.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Auction Architecture

FIG. 1 illustrates an exemplary system for implementing flexible asset pools in an online auction. A system 100 such as shown by an example of FIG. 1 can be implemented in connection with an online auction service for any type of commercial item, such as, for example, real property items (e.g., homes, real-estate notes, commercial property), motor vehicles (e.g., automobiles, motorcycles, boats), consumer electronics, collectibles, clothing, and/or non-performing loans (NPLs).

In an example of FIG. 1, system 100 includes functionality that can be implemented by processes, logical components and/or modules. In one implementation, the system 100 includes a bidder interface 110, a transaction component 120, an auction database 130, pool configuration logic 140, and a seller interface 150. When an online auction is initiated, persons (e.g., bidders) can interact with the bidder interface 110 to determine whether to place a bid, and to submit the bid for the item being auctioned. The transaction component 120 can implement a set of auction rules and logic for receiving bids and advancing the auction to completion.

The auction database 130 retains records that identify asset pools that are to be auctioned, and/or asset pools which are undergoing or have completed an auction. Furthermore, the auction database 130 can retain records of auctions in various states, including pre-auction, in-auction (auction initiated) and post-auction (auction completed). In some examples, the auction database 130 includes an asset pool database 134 and an asset database 132. The asset pool database 134 stores asset pool records (AP records) 121 that are used to identify the asset pools to be auctioned. The asset database 132 stores asset records 131 which identify the individual assets belonging to a particular asset pool. In addition, the asset database 132 can also store asset documents 133 that are associated with the asset records 131. Asset documents 133 may include, for example, certificates of authenticity, financial records, contractual agreements, and/or other documents which may be of interest to a potential buyer of the corresponding asset (or asset pool). For some embodiments, each AP record 121 is associated with (e.g., points to) one or more asset records 131 stored in the asset database 132, including any corresponding asset documents 133.

The bidder interface 110 includes functionality for enabling bidders to view and participate in an in-progress auction. The bidder interface 110 can be provided as, for example, a webpage that includes functional elements for enabling the users to provide input (e.g., bids 111) and to view real-time updates for the auction while it is in progress. In variations, the bidder interface 110 can be provided as application content, such as through a display or panel of a network-enabled application. The bidder interface 110 can include functionality for enabling a bidder to specify a bid 111, and to monitor real-time information about the auction. For example, the bidder interface 110 can display information about the asset pool being auctioned (e.g., description, images, etc.), information about individual assets contained in the asset pool, information about the seller, and/or a full or partial bid history (e.g., the bidder or bidder identity and a corresponding bid amount, the number of bids received in a given duration etc.). In addition, the bidder interface 110 can display timing information associated with a particular auction. Timing information may include, for example, the time remaining for a due diligence period associated with the auction and/or the time remaining before the auction is closed. For some embodiments, the bidder interface 110 may also display asset documents 131 associated with the asset pool being auctioned, and updates the asset documents 131 that can be displayed (e.g., in real-time) as individual assets are dynamically added to and/or removed from an asset pool.

The transaction component 120 can implement operations for progressing the auction towards completion. The transaction component 120 may retrieve AP records 121, and associated asset documents 131, from the auction database 130. Furthermore, the transaction component 120 may include functionality to (i) initiate an auction, (ii) advance the auction towards completion, and/or (iii) end or complete the auction when certain conditions are satisfied (e.g., after completion of time and/or satisfaction of completion rules). In addition to receiving and processing bids 111, the transaction component 120 provides auction updates 113 to the bidders that are viewing or participating in a particular auction. The auction update 113 can include information such as, a current price for the asset pool being auctioned, an amount of time remaining in the auction or due diligence period, and/or updates to an asset pool being auctioned (e.g., addition/removal of assets included in the asset pool, updated asset pool parameters, and/or new documents that are associated with the asset pool). Other information that can be updated by the transaction logic 120 and published through the bidder interface 110 include identifiers for active bidders, recent bid amounts, current bid increment, comments from other users, and information from other auctions that may be in various states (e.g., pre-auction versus in-progress). The auction update 113 can be published through the bidder interface 110 to the population of users.

The seller interface 150 enables individual sellers to create records that identify an asset pool for auction. For example, the seller interface 150 can enable sellers to specify information (e.g., one or more asset pool parameters) that identifies the asset pool being auctioned, the terms of sale, and other parameters such as a reserve price (which can be hidden from prospective bidders). The seller interface 150 may also enable the sellers to create and/or modify asset pools. For example, the seller interface 150 may enable sellers to input, select, or otherwise indicate (e.g., via AP instructions 141) one or more assets records 131 to be included with an AP record 121. Additionally, the seller interface 150 may enable the seller to specify one or more asset pool parameters (e.g., which may identify a number, type, value, and/or location of the individual assets associated with an asset pool) that can be used by the pool configuration logic 140 to programmatically add and/or remove individual assets from a particular asset pool.

As described by various examples, the pool configuration logic 140 can dynamically modify AP records 121 stored in the auction database 130. For example, as shown with respect to FIGS. 2A-2B, the pool configuration logic 140 may associate (e.g., reference) and/or disassociate (e.g., de-reference) one or more asset records 133 (e.g., stored in the asset database 132) with an asset pool 121 (e.g., stored in the asset pool database 134). For some embodiments, the associations between AP records 121 and asset records 131 (and asset documents 133) may be implemented using pointers. Accordingly, the pool configuration logic 140 can "create" an association by referencing a pointer, stored with an AP record 121, to point to the memory location (e.g., in asset database 132) where a corresponding asset record 131 is stored. Similarly, the pool control logic 140 can "delete" an association by de-referencing the pointer.

Figure 2A:
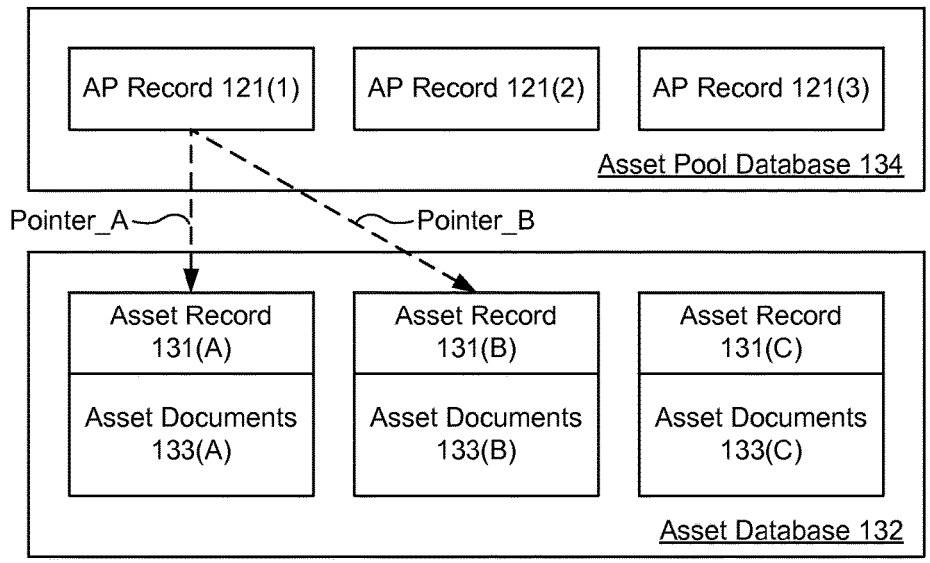
FIGS. 2A-2B illustrate an exemplary flexible asset pool.
Figure 2B:
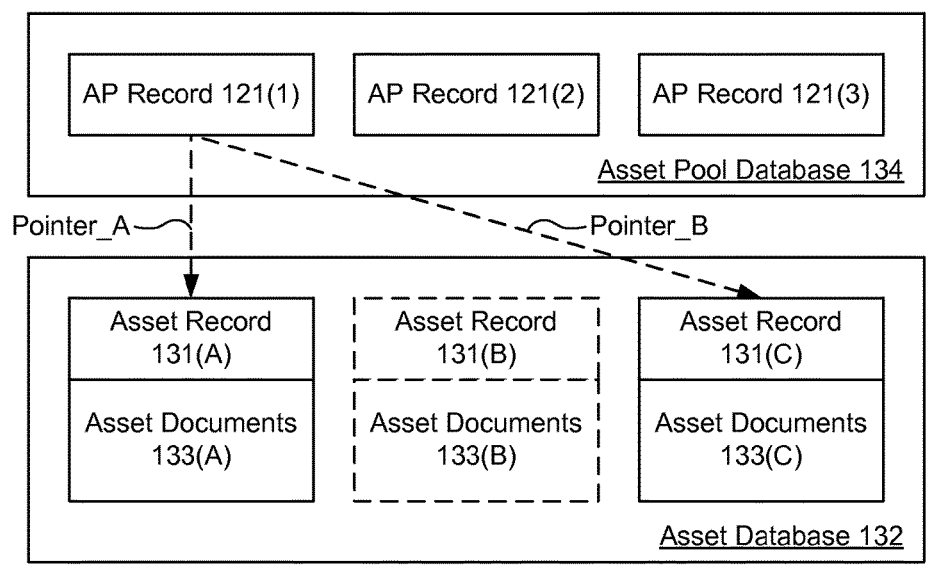

With reference to FIG. 2A, the pool configuration logic 140 may associate asset records 131(A) and 131(B), and accompanying asset documents 133(A) and 133(B), with AP record 121(1), for example, by storing a set of pointers (e.g., pointer_A and pointer_B) with the AP record 121(1) which points to memory locations in the asset database 132 that store the corresponding asset records 131(A) and 131(B) and asset documents 133(A) and 133(B). The pool configuration logic 140 can further modify the AP record 121(1) by referencing and/or dereferencing pointer_A and pointer_B. With reference to FIG. 2B, the pool configuration logic 140 may dynamically modify the asset pool associated with AP record 121(1) by "moving" pointer_B from the memory location(s), in asset database 132, that stores asset record 131(B) and asset documents 133(B) to the memory location(s) that stores asset record 131(C) and asset documents 133(C). This effectively removes an old asset (e.g., asset record 131(B)) from the asset pool and adds a new asset (e.g., asset record 131(C)) to take the place of the old asset.

The pool configuration logic 140 may include an asset pool parameter (AP parameter) modifier 142 and an asset pool update (AP update) manager 144. The AP update manager 144 may detect changes to one or more assets included with an asset pool being auctioned. The AP parameter modifier 142 may update or modify one or more AP parameters associated with an asset pool being auctioned.

In some examples, the AP update manager 144 may detect changes in the form of asset pool instructions (AP instructions) 141 received from a seller via the seller interface 150. The AP instructions 141 may include instructions to add and/or remove one or more assets in an asset pool. Furthermore, the AP instructions 141 may include instructions to move one or more assets between asset pools (i.e., from one asset pool to another).

In other examples, the AP update manager 144 may detect changes to one or more assets included with an asset pool based on the availability of such assets. For example, as described above, the availability of certain assets up for auction may be subject to change contrary to the seller's intention (and in some instances, without the seller's knowledge). Thus, for some embodiments, the AP update manager 144 may "monitor" (e.g., periodically check) the asset database 132 for changes to the asset records 131 stored therein.

In some examples, the AP parameter modifier 142 may update one or more AP parameters to reflect the changes to one or more assets included with an asset pool being auctioned. The AP parameters may be presented to a bidder via the bidder interface 110 to provide the bidder with information regarding the asset pool being auctioned. Examples of AP parameters may include (i) the number of assets in the asset pool, (ii) the types of assets in the asset pool, (iii) the total value of the asset pool, (iv) the value of individual assets in the asset pool, and/or (v) the geographical locations of assets in the asset pool. One or more of these parameters are likely to change whenever new assets are added to and/or removed from an asset pool. Accordingly, the AP parameter modifier 142 may update these AP parameters to keep the bidder apprised of any changes to a particular asset pool. The AP parameters may be included as part of (e.g., stored with) a corresponding AP record 121.

In other examples, the AP parameter modifier 142 may receive a set of AP parameter configuration instructions (e.g., in the form of AP instructions 141) from the seller via the seller interface 150. For example, the configuration instructions may define a set of fixed AP parameters which the AP parameter modifier 142 may use to programmatically modify asset pools. For example, by preconfiguring an asset pool to have a total value (e.g., of at least $1 M), the AP parameter modifier 142 may programmatically generate the asset pool by including individual assets that total in value to at least $1 M. If an asset (e.g., valued at $100 k) becomes unavailable before completion of the auction, the AP parameter modifier 142 may add one or more new assets (e.g., totaling in value to $100 k) to the asset pool.

Defining a set of fixed AP parameters for an asset pool may provide bidders and/or sellers with peace of mind. For example, bidders can bid with confidence knowing that, should any of the assets included with an asset pool become unavailable before an auction is completed, a new asset which satisfies the predefined AP parameters may be added in its place. Moreover, having "flexible" AP records 121 allows auctions to be completed on schedule, while also allowing the asset pools in a particular auction to be dynamically modified. More specifically, dynamically adding asset documents 133 for new assets that are added to an asset pool negates the need to restart a clock or timer for a due diligence period associated with the auction. It is to be noted that the due diligence period may occur before, and/or concurrently with, the overall auction period.

Methodology

Figure 3:
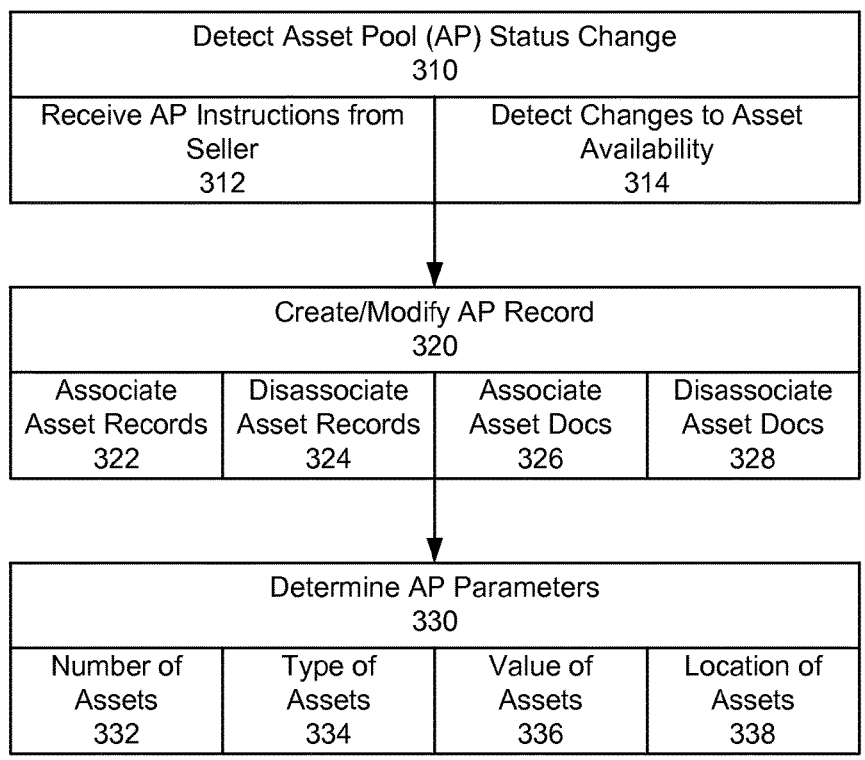
FIG. 3 illustrates an exemplary method of implementing a flexible asset pool.
Figure 4:
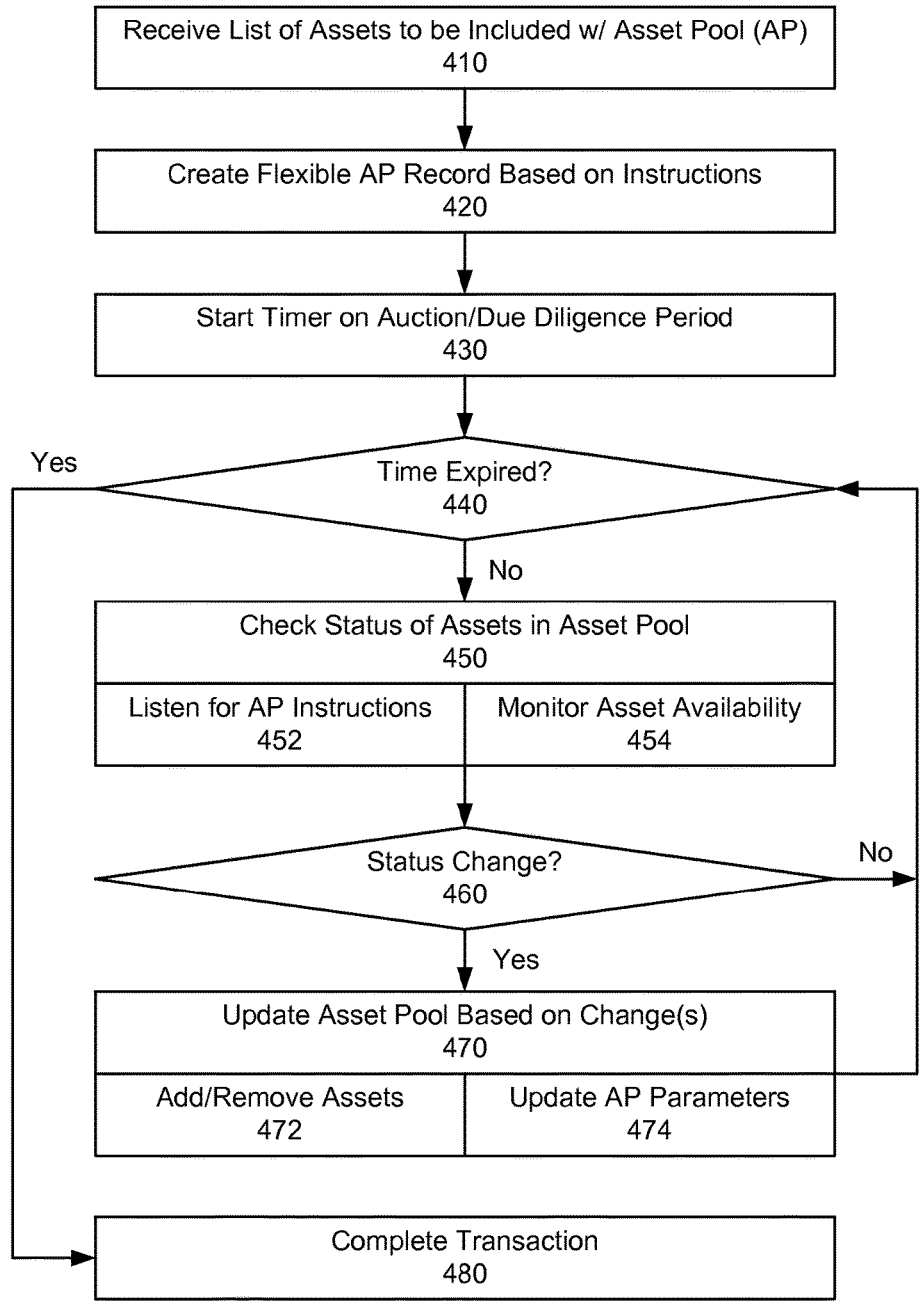
FIG. 4 illustrates an exemplary method of implementing an online auction using a flexible asset pool.

FIG. 3 illustrates an exemplary method of implementing a flexible asset pool. FIG. 4 illustrates an exemplary method of implementing an online auction using a flexible asset pool. Methods such as described by examples of FIG. 3 and FIG. 4 can be implemented using, for example, a system such as described with respect to FIG. 1. Accordingly, reference may be made to elements of FIG. 1 for purposes of illustrating suitable components for performing a step or sub-step being described.

In FIG. 3, a status change is detected for an asset pool (310). In some embodiments, the change in status may be detected based on instructions from a seller of the asset pool (312). For example, the AP update manager 144 may receive AP instructions 141 from the seller via the seller interface 150. In some examples, the AP instructions 141 may include instructions to add, remove, and/or swap one or more assets in an asset pool. The AP instructions 141 may also include instructions to create an asset pool. In some examples, the AP instructions 141 may specify a set of asset records 131 to be included with an AP record 121. In other examples, the AP instructions 141 may define a set of fixed AP parameters which may be used by the AP parameter modifier 142 to programmatically create and/or modify an asset pool. In some embodiments, the change in status may be detected based on a change in availability of a particular asset in the asset pool (314). For example, the AP update manager 144 may monitor the asset database 132 for changes to the asset records 131 stored therein.

Once a change in status has been detected for a particular asset pool, a corresponding AP record may be created and/or modified for that asset pool (320). In some examples, the AP record may be created and/or modified by associating asset records with the AP record (322) or disassociating asset records with the AP record (324). The pool configuration logic 140 may dynamically create an association between an AP record 121 and one or more asset records 131, for example, by referencing a pointer, stored with the AP record 121, to point to one or more memory locations (e.g., in asset database 132) where the corresponding asset record(s) 131 are stored. The pool configuration logic 140 may subsequently delete the association by dereferencing the pointer.

In the examples described with respect to FIGS. 2A and 2B, asset documents 133 may be stored in the same, or consecutive, memory locations as their corresponding asset records 131. In such implementations, only one pointer is needed to associate the AP record 121 with both the asset record 131 and the corresponding asset documents 133. However, in some implementations, the asset documents 133 may be stored separately (e.g., in a separate asset record database). Thus, in some examples, one or more asset documents 133 may be associated with the AP record 121, apart from the asset records 131. The pool configuration logic 140 may dynamically create and/or delete an association between an AP record 121 and one or more asset documents 133, for example, by referencing and/or dereferencing a pointer, stored with the AP record 121, which points to one or more memory locations where the corresponding asset documents 133 are stored.

After an asset pool is created and/or modified, one or more AP parameters associated with the asset pool may be determined (330). Examples of AP parameters may include the number of assets in the asset pool (332), the types of assets in the asset pool (332), the value of assets in the asset pool (336), and/or the geographical locations of assets in the asset pool (338). In some examples, the AP parameter modifier 142 may update one or more AP parameters to reflect one or more corresponding changes to an AP record 121. The AP parameters may be presented to a bidder via the bidder interface 110, to provide the bidder with information regarding the asset pool being auctioned.

FIG. 4 shows an exemplary auction process, which is herein described with reference to the system 100 of FIG. 1. The pool configuration logic 140 initially receives a list of assets to be included with an asset pool (410). For example, the pool configuration logic 140 may receive AP instructions 141 from the seller, via the seller interface 150, which may include instructions to create an asset pool. In some examples, the AP instructions 141 may specify a set of asset records 131 to be included with an AP record 121. In other examples, the AP instructions 141 may define a set of fixed AP parameters which may be used by the AP parameter modifier 142 to programmatically create and/or modify an asset pool.

The pool configuration logic 140 then creates a flexible AP record 121 based on the AP instructions 141 (420). For example, as described above, the pool configuration logic 140 may dynamically create an association between the AP record 121 and one or more asset records 131 (e.g., using pointers which can be referenced and/or dereferenced). In some examples, the pool configuration logic 140 may associate the AP record 121 with a number of seller-specified asset records 131 provided with the AP instructions 141. The pool configuration logic 140 may then determine a set of AP parameters for the asset pool, based on the assets associated with the asset pool, to be included with the AP record 121. In other examples, the pool configuration logic 140 may programmatically select one or more asset records 131 to be associated with the AP record 121, according to a set of predefined AP parameters specified in the AP instructions 141.

Once the AP record 121 has been created, the transaction component 120 may start a timer on an auction and/or due diligence period (430). For some examples, the transaction component 120 may provide the time remaining for the auction and/or due diligence period to the bidder interface 110 through a series of auction updates 113.

As long as the timer has not expired (440), the pool configuration logic 140 may continuously (or periodically) check the status of the assets in the asset pool (450). In some examples, the pool configuration logic 140 may check the status of the assets by listening for AP instructions 141 from a seller (452). In other examples, the pool configuration logic 140 may check the status of the assets by monitoring the availability of asset records 131 in the asset database 132 (454). If no status change is detected (460), and the timer has not expired (440), the pool configuration logic 140 continues to check the status of the assets in the asset pool (450).

If a status change is detected (460), the pool configuration logic 140 updates the asset pool based on the detected changes (470). Specifically, the AP update manager 144 may add or remove one or more assets in the asset pool (472). For example, the AP update manager 144 may add or remove the assets by associating (e.g., referencing) or disassociating (e.g., dereferencing) asset records 131 with a corresponding AP record 121. The AP parameter modifier 142 may then update the set of AP parameters associated with the AP record 121 (474). Examples of AP parameters may include: (i) the number of assets in the asset pool, (ii) the types of assets in the asset pool, (iii) the value of assets in the asset pool, and/or (iv) the geographical locations of assets in the asset pool.

Once the timer expires (440), the transaction is completed (480). In some examples, the transaction may correspond with a due diligence period wherein potential buyers/bidders are able to review asset documents 133 associated with an asset pool prior to the auction. In other examples, the transaction may correspond to the actual auction itself. It should be noted that, once the timer is started on the auction and/or due diligence period (430), the timer may continue to run, uninterrupted, until the transaction is complete (480). During this period, however, assets may be dynamically added to and/or removed from the asset pool (450-470).

Examples

Figure 5:
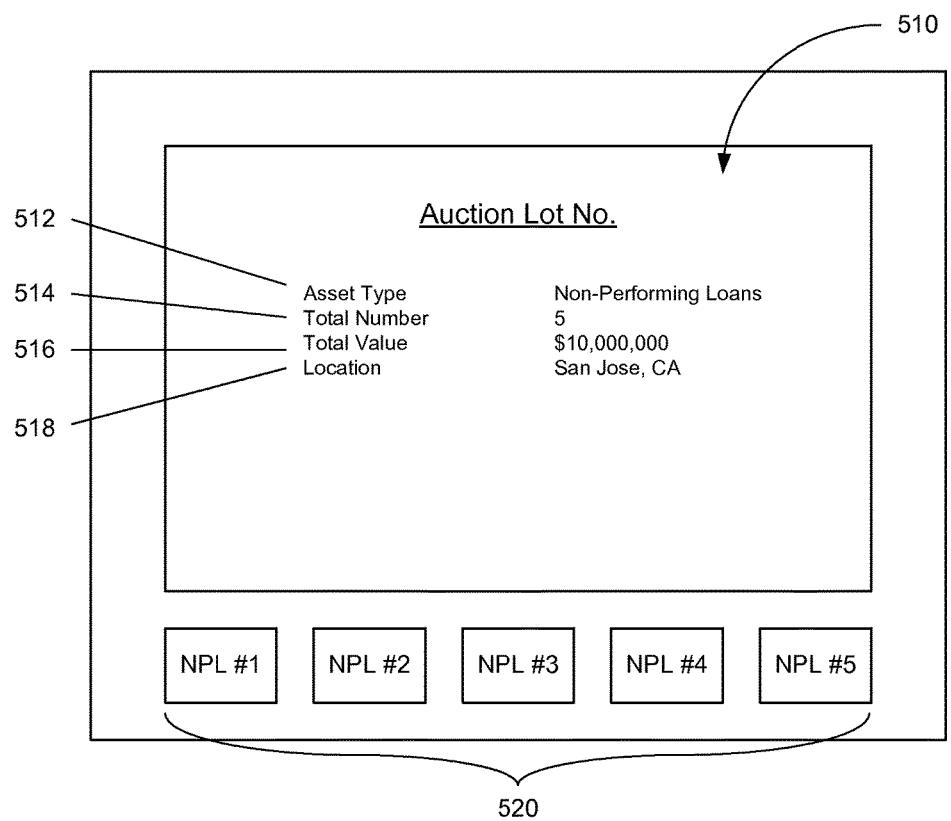
FIG. 5 illustrates an example bidder interface in which a flexible asset pool record is displayed.

FIG. 5 illustrates an example bidder interface in which a flexible asset pool record 510 is displayed. In the example provided, the bidder interface may correspond to a web page, or set of web pages, where items can be auctioned. In the example provided, the items correspond to asset pools. Descriptive information may accompany the AP record 510 for the asset pool being auctioned. For example, descriptive information may include a set of AP parameters 512-518 that describe the pool of assets, as a whole. The displayed AP parameters include the type of assets in the asset pool 512 (e.g., "Non-Performing Loans"), the total number of assets in the asset pool 514 (e.g., "5"), the total value of the asset pool 516 (e.g., "$10,000,000"), and the location of the assets in the asset pool 518 (e.g., "San Jose, Calif."). The bidder interface also displays links to asset documents 520 associated with each of the assets listed in the AP record 510.

For some examples, when an asset is added to or removed from the asset pool, the AP parameters 512-518 may be updated to reflect the change. In other examples, the AP parameters 512-518 may correspond to seller-defined fixed parameters for the asset pool. The links to asset documents 520 may similarly be updated to reflect such changes to the asset pool. For example, if NPL #1 is removed from the asset pool, the link to the associated asset documents for NPL #1 may be deleted accordingly. If NPL #1 is replaced by a new NPL #6, the link to the associated asset documents for NPL #1 may be modified to link to the asset documents for NPL #6.

Computer System

Figure 6:
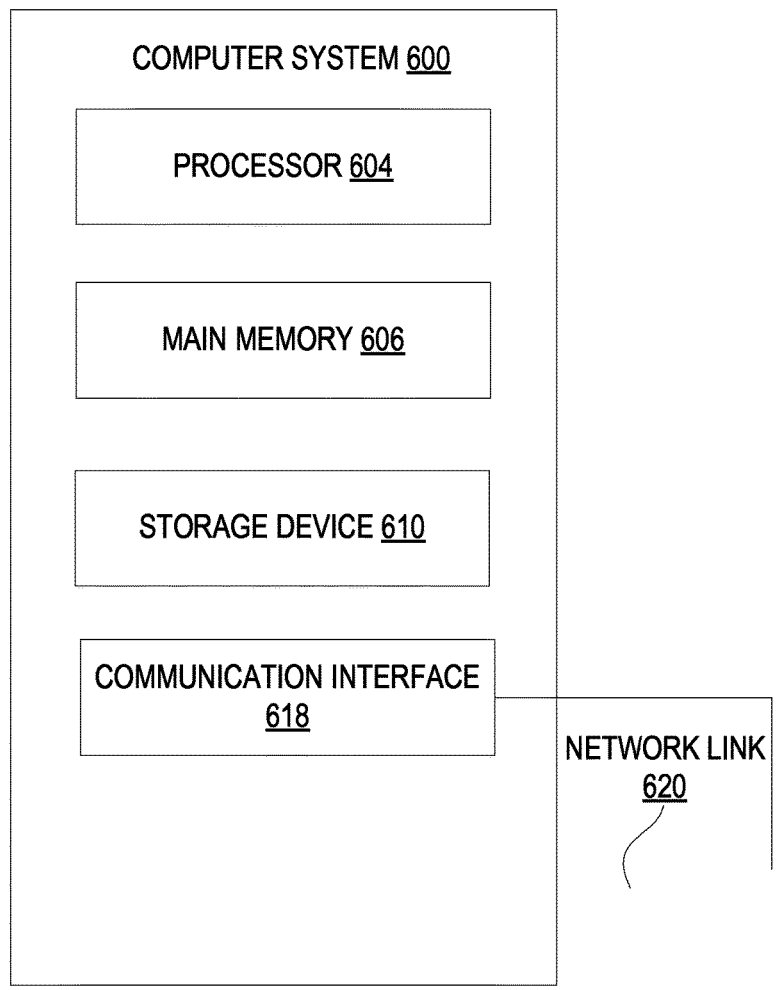
FIG. 6 is a block diagram that illustrates a computer system upon which embodiments described herein may be implemented.

FIG. 6 is a block diagram that illustrates a computer system upon which embodiments described herein may be implemented. For example, in the context of FIG. 1, system 100 may be implemented using one or more servers such as described by FIG. 6.

In an embodiment, computer system 600 includes processor 604, memory 606 (including non-transitory memory), storage device 610, and communication interface 618. Computer system 600 includes at least one processor 604 for processing information. Computer system 600 also includes the main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 may also include a read only memory (ROM) or other static storage device for storing static information and instructions for processor 604. The storage device 610, such as a magnetic disk or optical disk, is provided for storing information and instructions. The communication interface 618 may enable the computer system 600 to communicate with one or more networks through use of the network link 620 (wireless or wireline). The communication interface 618 may communicate with bidders and auction participants using, for example, the Internet.

Embodiments described herein are related to the use of computer system 600 for implementing the techniques described herein. According to one embodiment, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computer-implemented method for conducting an online auction on an online auction forum, the method being implemented by a network system and comprising:

maintaining, by the network system for the online auction, a set of dynamically-modifiable objects, each including a pointer referencing a corresponding one of a set of data records, wherein each data record of the set of data records is associated with a respective asset for auction on an online auction forum, and wherein the set of data records is identified by the network system from a collection of data records stored in a database accessible to the network system based on one or more parameters;

during the online auction, detecting a change in status for a first data record of the set of data records, the first data record being referenced by a first pointer of a first dynamically-modifiable object of the set of dynamically-modifiable objects; and in response to detecting in the change in status for the first data record, identifying, by the network system based on the one or more parameters, a second data record not referenced by pointers of the set of dynamically-modifiable objects and automatically updating the first dynamically-modifiable object by de-referencing the first pointer from the first data record and referencing the first pointer to the second data record.

2. The computer-implemented method of claim 1, further comprising:

generating a set of asset document pointers associated with the set of data records, each of the set of asset document pointers referencing one or more documents stored in the database.

3. The computer-implemented method of claim 1, further comprising receiving an instruction to update the one or more parameters.

4. The computer-implemented method of claim 1, wherein detecting the change in status for the first data record comprises:

receiving an instruction to remove the first data record from the set of data records.

5. The computer-implemented method of claim 2, further comprising:

in response to detecting in the change in status for the first data record, updating the set of asset document pointers.

6. The computer-implemented method of claim 2, further comprising:

enabling a bidder to access to the one or more documents stored in the database.

7. The computer-implemented method of claim 1, wherein detecting the change in status for the first data record comprises:

monitoring an availability of the first data record.

8. The computer-implemented method of claim 1, wherein detecting the change in status for first data record includes detecting that an asset corresponding to the first data record is no longer for sale.

9. The computer-implemented method of claim 1, further comprising:

enabling a seller to specify the one or more parameters.

10. The computer-implemented method of claim 1, further comprising recalculating at least one of the one or more parameters.

11. The computer-implemented method of claim 1, wherein the set of data records comprises a set of non-performing loans.

12. A network system comprising:
one or more processors;
one or more memory resources storing instructions that, when executed by the one or more processors, cause the network system to:
 maintain, for an online auction, a set of dynamically-modifiable objects, each including a pointer referencing a corresponding one of a set of data records, wherein each data record of the set of data records is associated with a respective asset for auction on an online auction forum, and wherein the set of data records is identified by the network system from a collection of data records stored in a database accessible to the network system based on one or more parameters;
 during the online auction, detect a change in status for a first data record of the set of data records, the first data record being referenced by a first pointer of a first dynamically-modifiable object of the set of dynamically-modifiable objects; and
 in response to detecting in the change in status for the first data record, identify, by the network system based on the one or more parameters, a second data record not referenced by pointers of the set of dynamically-modifiable objects and automatically update the first dynamically-modifiable object by de-referencing the first pointer from the first data record and referencing the first pointer to the second data record.

13. A non-transitory computer-readable medium storing instructions that, when executed by one or more processors of a network system, cause the network system to:
 maintain, for an online auction, a set of dynamically-modifiable objects, each including a pointer referencing a corresponding one of a set of data records, wherein each data record of the set of data records is associated with a respective asset for auction on an online auction forum, and wherein the set of data records is identified by the network system from a collection of data records stored in a database accessible to the network system based on one or more parameters;
 during the online auction, detect a change in status for a first data record of the set of data records, the first data record being referenced by a first pointer of a first dynamically-modifiable object of the set of dynamically-modifiable objects;
 in response to detecting in the change in status for the first data record, identify, by the network system based on the one or more parameters, a second data record not referenced by pointers of the set of dynamically-modifiable objects and automatically update the first dynamically-modifiable object by de-referencing the first pointer from the first data record and referencing the first pointer to the second data record.

14. The computer-implemented method of claim 1, wherein the one or more parameters specify one or more of (i) a number of assets associated with the set of data records; (ii) one or more types of assets; (iii) a total value of the assets associated with the set of data records; (iv) a per-item value; or (v) a geographic location of assets associated with the set of data records.

15. The network system of claim 12, wherein the one or more parameters specify one or more of (i) a number of assets associated with the set of data records; (ii) one or more types of assets; (iii) a total value of the assets associated with the set of data records; (iv) a per-item value; or (v) a geographic location of assets associated with the set of data records.

16. The non-transitory computer-readable medium of claim 13, wherein the one or more parameters specify one or more of (i) a number of assets associated with the set of data records; (ii) one or more types of assets; (iii) a total value of the assets associated with the set of data records; (iv) a per-item value; or (v) a geographic location of assets associated with the set of data records.

* * * * *